April 12, 1938.  R. E. SPOKES  2,114,037
FRICTION ELEMENT
Filed Dec. 23, 1936
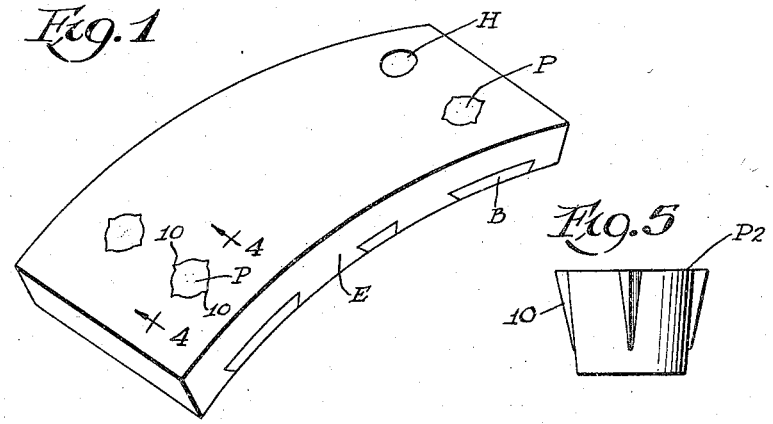
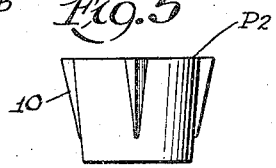
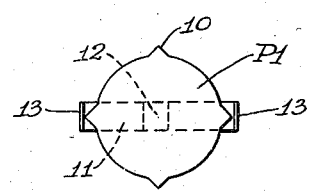
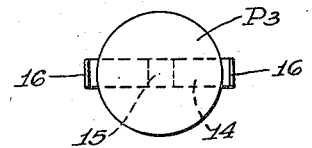
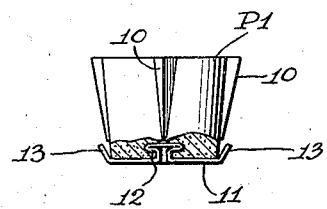
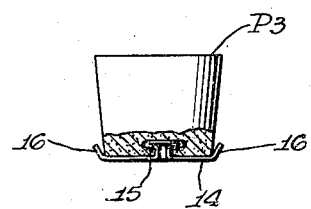
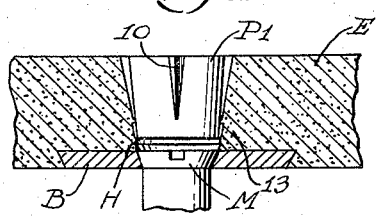
Inventor:
Ray E. Spokes
By: Belt and Wallace
Attys Patented Apr. 12, 1938

2,114,037

UNITED STATES PATENT OFFICE 2,114,037

FRICTION ELEMENT

Ray E. Spokes, Ann Arbor, Mich., assignor to The American Brake Shoe and Foundry Company, a corporation of Delaware Application December 23, 1936, Serial No. 117,309

12 Claims. (Cl. 188—251)

This invention relates to friction elements and more particularly to plugs for use with such elements.

Friction elements made in the form of blocks and usually having rigid backing members embedded therein have openings extending thereinto from the friction surfaces thereof to a predetermined depth and usually to the backs when such backs are employed. The fastening means for securing the friction elements to the operative members of brake couples are passed through these openings. Inasmuch as the friction elements must be rigidly secured in position fastening means of relatively substantial size are usually employed, and hence the openings through which such fastening means are passed are also of relatively substantial size and the result of this is that there is a decrease in the area of the friction surface of the friction element in the aggregate amount of the size of the openings. Moreover, sand or other foreign matter has been known to collect in such openings and this sometimes resulted in abrasion of the surfaces against which the friction elements were engaged and the collection of such foreign matter in such openings is otherwise objectionable.

Thus among the important objects of this invention is to overcome the reduction in the area of the friction surfaces of friction elements resulting from the provision of fastening means openings in such elements by closing such openings after the positioning of fastening means therein, and another object is to close such fastening means openings with material comparable to the friction material of the friction elements whereby the closures for the fastening means openings will function like the friction material of the friction elements and thereby abrogate the reduction in the friction surfaces of the friction elements.

A further important object of my invention is to close the fastening means openings in friction elements and thereby prevent the collection of foreign matter in such openings.

Still further objects are to insure against displacement of closures for the fastening means openings in friction elements and the like; to facilitate installation of the closures; and to provide novel closures of simple and economical construction and which will be efficient and positive in use.

Other and further objects will be apparent from the following description wherein reference is made to the accompanying drawing in which selected embodiments of my invention are illustrated and wherein Fig. 1 is a perspective view of a typical friction element and in which my novel closures are mounted in selected of the fastening means openings in the friction element;

Fig. 2 is a top plan view of one form of my closures;

Fig. 3 is a view, partly in elevation and partly in section, of the closure shown in Fig. 2;

Fig. 4 is a fragmentary sectional detail view taken substantially on the line 4—4 on Fig. 1;

Fig. 5 is a side elevation of another form of my closures;

Fig. 6 is a plan view of still another form; and

Fig. 7 is a side view, partly in elevation and partly in section, of the form shown in Fig. 6.

The friction element E shown in Fig. 1 is of the type having a reenforcing back B embedded therein at the rear face of the body thereof. The body is composed of suitable friction material for example of the kind described in the Thompson Patent 1,761,057, the Blume Patent 1,866,287, the Blume Patent 1,924,021, or the Lidkea and Spokes Patent 2,052,779 or other kindred or suitable material. Fastening means openings H extend into the body of the friction element from the friction surface thereof and in the present instance these openings extend to the back B although, as is understood in the art, it is not essential that the openings H extend entirely to the back. Furthermore, in those friction elements not provided with a reenforcing back openings such as the openings H extend thereinto for a sufficient distance to dispose the heads of the fastening means inserted into these openings well below the friction surfaces of the elements. Three of the four openings H in the friction element E have closures or plugs P mounted therein and my invention particularly pertains to such closures or plugs.

In Figs. 2 and 3 I have shown a substantially cylindrical plug or closure P1 which in plan has an outline similar to the outline of the openings as H in the friction element as E, in which openings the plugs P1 are to be inserted. Thus if the openings H were of rectangular outline the plug P1 would be in the form of a cube instead of being substantially cylindrical and the plan of configuration would be otherwise varied if the openings as H were of some other outline.

In order to facilitate insertion of plugs as P1 in openings as H the side wall of the plug P1 is tapered (the taper being exaggerated in the drawing to better illustrate it) so that the lower end of the plug is of less diameter than the upper end thereof. The diameter of the upper end of the plug P1 is sized to neatly and tightly fit in the openings as H, and hence since the plug is of less diameter at the lower end it is manifest that the lower end of the plug P1 may be freely passed into an opening H.

Friction elements are usually worn down in a predetermined amount in the use thereof before being replaced and the height of the plug P1 is such that, when the head thereof is flush with the friction surface of the friction element in which the opening into which the plug is inserted is provided, the plug will be extended at least to and preferably beyond the predetermined place in the element to which it is worn away in use before being replaced, wherefore the plug will remain in the place and will function throughout the life of the element.

It is essential that displacement of plugs as P1 from openings as H be prevented and to this end ribs 10 are provided on the side wall of the plug P1 at spaced intervals, said ribs 10 being arranged at 90° intervals on the plug as shown. The ribs 10 like the side wall of the plug are tapered so that they reduce in size toward the lower ends thereof, which lower ends, as best shown in Fig. 3, are terminated in spaced relation with the lower end of the plug. Furthermore, the ribs 10 are preferably substantially V-shaped in cross-section and therefore when the plug is forced into one of the openings H in the friction element E the apices of these ribs and the taper thereof facilitate entry of these ribs into the friction material of the friction element about the opening, and these ribs bite, in the manner shown in Fig. 4, into the material whereby the plug P1 is tightly secured in the opening H when it is inserted therein sufficiently to dispose the top surface of the plug flush with the friction surface of the element.

It will be appreciated that it is essential that displacement of plugs P1 from openings as H be prevented for otherwise the utility thereof is destroyed. Hence to further insure against displacement of the plug a metal strip 11 is passed across the lower end of the plug P1 and is provided, approximately medially in the extent thereof, with a substantially T-shaped or otherwise deformed portion 12 which is embedded in the body of the plug P1 to firmly interconnect the strip to the plug. The end portions of the strip are extended beyond the side wall of the plug and are bent upwardly into angular relation with the side wall to thereby provide ears 13 which, as illustrated in Fig. 4, dig into the body material of the friction element and effectively resist outward movement of a plug as P1 from the opening as H. In the present instance the strip 11 is passed across the bottom of the plug P1 to dispose the ears 13 in alignment with oppositely disposed ribs 10, but it is not essential that the ears be aligned with the ribs and in some instances it may be advantageous to arrange the ears to be positioned intermediate adjacent ribs instead of in alignment with oppositely disposed ribs.

After a fastening means such as the bolt M has been inserted into an opening H, a plug as P1 is forced into the opening and firmly seats therein above the head of the fastening means as is illustrated in Fig. 4 and, as stated heretofore, the top of the plug is positioned to be flush with the friction surface of the friction element. Preferably, though not necessarily, the plug is made of a material substantially like the friction material of the friction element and therefore the top of the plug provides a friction surface like the friction surface of the element and this overcomes the reduction in friction surface resulting from the provision of the opening as H.

The importance of this augmentation of the friction surface can be better appreciated when it is recognized that an automotive vehicle such as a bus is often equipped with as many as eight friction elements as E and the openings as H in such elements may be as much as one inch in diameter. Thus if each element has four openings therein which are one inch in diameter, the provision of plugs as P1 in each of the openings will provide an additional thirty-two square inches of friction surface which in many instances will be as much as, if not more than, the entire friction surface of a friction element.

The plug P2 illustrated in Fig. 5 is similar to the plug P1 in all respects except that it is not provided with a strip affording ears as 13, and such a plug will provide a satisfactory closure for openings H especially in those friction elements which are not subjected to substantial vibration or jarring.

The plug P3 illustrated in Figs. 6 and 7, like the plug P2, is similar to the plug P1 and has a strip 14, including a deformed portion 15 and providing ears 16, embedded in the lower end thereof, but the plug P3 is not provided with ribs such as the ribs 10 on the plug P1. A plug such as the plug P3 is particularly suitable for use with friction elements comprising hard and brittle friction material which might be fractured if plugs having ribs thereon were forced into openings in such material. Inasmuch as the plug P3 is provided with ears it is manifest that displacement of such plugs once they are inserted in openings as H is effectively prevented.

The plugs of my invention are preferably molded and, as stated, they are preferably molded from material of a composition similar to the composition of the friction elements with which they are to be used. It is to be understood, however, that the plugs might be made in some other manner without departing from the the ambit of my invention. When, however, the plugs are molded the embedding of the deformed portions as 12 and 15 of strips as 11 and 14 in the material of the plugs is facilitated, for the strips as 11 and 14 may be placed in the bottom of the molds prior to the time the composition material is introduced into the molds and the embedding of the deformed portions will therefore be effected in the molding operation.

While I have illustrated and described selected embodiments of my invention it is to be understood that these are capable of variation and modification and I therefore do not wish to be limited to the precise details set forth but desire to avail myself of such changes and alterations as fall within the purview of the following claims.

I claim:

1. In a friction element or the like which has an opening therein into which means for fastening the friction element or the like in position may be inserted, the combination of a closure mounted in said opening and shaped correspondingly to said opening, said closure being sized to fit tightly in said opening and extending into said opening sufficiently to close said opening throughout the life of the element or the like as the element wears away in use, and means for preventing displacement of said closure from said opening.

2. In a friction element or the like which has an opening therein into which means for fastening the friction element or the like in position may be inserted, the combination of a closure mounted in said opening and shaped correspondingly to said opening, said closure being sized to fit tightly in said opening and extending into said opening sufficiently to close said opening throughout the life of the element or the like as the element wears away in use, and means on said closure for biting into the material about the opening to prevent displacement of said closure from said opening.

3. In a friction element or the like which has an opening therein into which means for fastening the friction element or the like in position may be inserted, the combination of a closure mounted in said opening and shaped correspondingly to said opening, said closure being sized to fit tightly in said opening and extending into said opening sufficiently to close said opening throughout the life of the element or the like as the element wears away in use, and at least one rib on the side of said closure for biting into the material about the opening to prevent displacement of said closure from said opening.

4. In a friction element or the like which has an opening therein into which means for fastening the friction element or the like in position may be inserted, the combination of a closure mounted in said opening and shaped correspondingly to said opening, said closure being sized to fit tightly in said opening and extending into said opening sufficiently to close said opening throughout the life of the element or the like as the element wears away in use, and at least one ear extending outwardly from the side of the closure for biting into the material about the opening to prevent displacement of said closure from said opening.

5. A closure for the fastening means opening in a friction element or the like, said closure being of greater area at one end thereof than at the other end thereof whereby the side of said closure is tapered, and at least one rib on said tapered side extending therealong toward the ends of said closure and adapted to bite into the material about the opening into which the closure is inserted to prevent displacement of the closure from the opening.

6. A closure for the fastening means opening in a friction element or the like, said closure being of greater area at one end thereof than at the other end thereof whereby the side of said closure is tapered, and at least one rib on said tapered side extending therealong toward the ends of said closure, said rib being tapered to extend from said tapered side in greater amount near the larger end of said closure than near the smaller end of the closure, said rib being adapted to bite into the material about the opening into which the closure is inserted to prevent displacement of the closure from the opening.

7. A closure for the fastening means opening in a friction element or the like, said closure being of greater area at one end thereof than at the other end thereof whereby the side of said closure is tapered, and means extended beyond the tapered side of said closure and providing an ear near the smaller end of the closure, said ear being arranged in angular relation with said side and projecting toward the larger end of the closure and being adapted to bite into the material about the opening into which the closure is inserted to prevent displacement of the closure from the opening.

8. A closure for the fastening means opening in a friction element or the like, said closure being of greater area at one end thereof than at the other end thereof whereby the side of said closure is tapered, and a strip extending across said closure and having at least a portion thereof embedded in said closure, said means providing ears at the side of said closure, said ears being arranged in angular relation with said side and projecting toward the larger end of the closure and being adapted to bite into the material about the opening into which the closure is inserted to prevent displacement of the closure from the opening.

9. A closure for the fastening means opening in a friction element or the like, said closure being of greater area at one end thereof than at the other end thereof whereby the side of said closure is tapered, at least one rib on said tapered side extending therealong toward the ends of said closure, and means extended beyond the tapered side of said closure and providing an ear near the smaller end of the closure, said ear being arranged in angular relation with said side and projecting toward the larger end of the closure, said rib and ear being adapted to bite into the material about the opening into which the closure is inserted to prevent displacement of the closure from the opening.

10. In a friction element or the like comprising a body of composition friction material and having an opening therein into which means for fastening the friction element or the like in position may be inserted, the combination of a closure mounted in said opening and formed from composition friction material substantially similar to the composition friction material of the body whereby said closure restores the area of the friction surface of the element, and means for preventing displacement of said closure from said opening.

11. In a friction element or the like which has a body of composition friction material and a backing plate imbedded in the rear face of said body, said element or the like having an opening therein extending through said body and plate and into which means for fastening the friction element or the like in position may be inserted, the combination of a closure mounted in said opening and formed from composition friction material substantially similar to the composition friction material of the body, said closure extending into said opening in an amount substantially equal to the thickness of the composition body whereby said opening remains closed throughout the life of the element or the like as it wears away in use.

12. In a friction element or the like which has a body of composition friction material and a backing plate imbedded in the rear face of said body, said element or the like having an opening therein extending through said body and plate and into which means for fastening the friction element or the like in position may be inserted, the combination of a closure mounted in said opening and formed from composition friction material substantially similar to the composition friction material of the body, said closure extending into said opening in an amount substantially equal to the thickness of the composition body whereby said opening remains closed throughout the life of the element or the like as it wears away in use, and means for preventing displacement of said closure from said opening.

RAY E. SPOKES.